(12) United States Patent
Guinea Peña et al.

(10) Patent No.: US 7,025,420 B2
(45) Date of Patent: Apr. 11, 2006

(54) VEHICLE SEAT WHICH CAN BE TRANSFORMED INTO A BED

(75) Inventors: José Antonio Guinea Peña, Burgos (ES); Raul Santesteban Otazu, Pamplona (ES)

(73) Assignee: Grupo Antolin -Ingenieria, S.A., (ES)

( * ) Notice: Subject to any disclaimer, the term of this patent is extended or adjusted under 35 U.S.C. 154(b) by 0 days.

(21) Appl. No.: 10/508,473

(22) PCT Filed: Mar. 21, 2002

(86) PCT No.: PCT/ES02/00138

§ 371 (c)(1),
(2), (4) Date: Nov. 22, 2004

(87) PCT Pub. No.: WO03/080386

PCT Pub. Date: Oct. 2, 2003

(65) Prior Publication Data

US 2005/0104432 A1 May 19, 2005

(51) Int. Cl.
*B60N 2/34* (2006.01)

(52) U.S. Cl. .................................... 297/354.13; 297/64

(58) Field of Classification Search ........... 297/354.13, 297/64, 320; 296/69
See application file for complete search history.

(56) References Cited

U.S. PATENT DOCUMENTS

| | | | | |
|---|---|---|---|---|
| 2,796,918 A | | 6/1957 | Luckhardt et al. | 155/116 |
| 3,052,499 A | * | 9/1962 | Wood | 297/64 |
| 3,743,350 A | * | 7/1973 | Allen | 297/64 |
| 4,268,086 A | | 5/1981 | Okuyama | 297/63 |
| 5,454,624 A | | 10/1995 | Anglade et al. | 297/354.13 |
| 6,135,558 A | | 10/2000 | Behrens et al. | 297/353 |

FOREIGN PATENT DOCUMENTS

| | | |
|---|---|---|
| DE | 1 680 026 | 9/1971 |
| DE | 100 35 256 C1 | 12/2001 |
| EP | 0 628 445 A1 | 12/1994 |
| GB | 809110 | 2/1959 |

\* cited by examiner

*Primary Examiner*—Anthony D. Barfield
(74) *Attorney, Agent, or Firm*—Ostrolenk, Faber, Gerb & Soffen, LLP

(57) ABSTRACT

The seat includes the structure (3) of the backrest (1) and the structure (5) of the cushion (2), the former foldable backward to provide by a slight simultaneous elevation of the cushion (2) its transformation into a bed as the folded backrest (1) and the cushion (2) are placed horizontally with their surfaces aligned. The structures (3) and (5) of the backrest and cushion are connected to each other by a swivelling shaft (10) about which they can both revolve freely, so that folding backward the structure (3) of the backrest implies pushing and raising the structure (5) of the cushion, as it is connected on its anterior part by a hinged connecting rod (7) between the structure (5) of the cushion (2) and the general fixed structure (6) of the seat.

1 Claim, 2 Drawing Sheets

VEHICLE SEAT WHICH CAN BE TRANSFORMED INTO A BED

PRIORITY CLAIM

This is a U.S. national stage of application No. PCT/ES02/00138, filed on Mar. 21, 2002.

OBJECT OF THE INVENTION

The present invention relates to a car seat having mechanisms that allow folding the seat backrest backwards and raising slightly the seat cushion to determine a horizontal surface that can be used as a bed if desired.

The object of the invention is to provide means embodied in a small number of parts that, when duly associated both structurally and functionally in their application in a car seat, allow transforming the car seat into a bed by a backwards folding of the backrest and a slight raising of the seat cushion to form a perfectly flat surface that can be used as a bed.

BACKGROUND OF THE INVENTION

Folding of car seat backrests is commonly performed to provide a more or less flat surface that can be used as a bed. Obviously, when the seat backrest is folded backwards the seat cushion is left somewhat lower than the plane defined by the former, so that the bed will not be comfortable to lie on.

In this sense, systems or mechanisms are known that allow folding a car seat backrest backwards and also slightly raising the seat cushion to improve the horizontal plane of the assembly; this is, to provide a horizontal or aligned surface between the upper part of the cushion and the upper part of the backrest when the latter is folded backwards.

An example of a mechanism that allows folding the seat backrest backwards and raising its cushion to form a bed is provided in U.S. Pat. No. 6,135,558 in which an arched part in the form of a connecting rod is disposed between the seat cushion and the backrest which is tilted when folding the backrest backwards, thereby raising the rear part of the cushion, the front part of which is also lifted by a set of connecting rods hinged to each other as well as to the seat cushion and to the fixed structure of the seat.

The mechanism is completed by locking means to maintain stability both in the normal position of the backrest and in its folded position, in order to stabilise these positions as mentioned.

In any case, this mechanism has drawbacks such as the need for two connecting rods and their corresponding hinges to raise the front part of the cushion as the backrest is folded backwards, as well as the need to use a hinged rod to connect the cushion with the backrest in spite of the poor reliability of the arching means between the stable resting and folded positions.

Other mechanisms are described in documents such as German Patent DE 10035256 C1, U.S. Pat. No. 4,268,086, European Patent EP 0628445 A1, among others, although all have the disadvantage that the mechanisms used to transform the car seat into a bed are complex, as they comprise a great number of parts with the resulting drawbacks.

DESCRIPTION OF THE INVENTION

The car seat transformable into a bed disclosed herein has been conceived to solve the above described problem by a simple mechanism, as it is formed by a minimal number of parts that allow folding the backrest backwards while simultaneously raising slightly the seat cushion to form a horizontal surface and, by means of a simple latch formed by a swivelling part, allow locking the backrest in both the folded and vertical positions, keeping them in this position unless the said locking part is intentionally actuated.

More specifically, the mechanism applicable to the car seat object of the invention is characterised in that the backrest is joined to the seat structure by a shaft with respect to which the backrest can revolve, while the backrest is connected to the cushion by another rotation shaft that allows the free folding or rotation of one with respect to the other about this hinge point for the two elements (the backrest and the cushion).

The structure of the backrest comprises a part in which is established the hinge shaft with the cushion, which in the resting position of the backrest is located under the rear part of the cushion, so that when the backrest is folded backwards the cushion is pushed and raised. In turn, the front part of the cushion is connected by a hinged rod to the fixed seat structure. This seat structure supports all loads and is provided with support elements that act as stops when reaching one of the two final positions corresponding to the seat function as such and the bed function in the seat transformation.

These final positions are stabilised by a swivelling part that acts as a latch, mounted by a swivelling shaft to the seat structure so that in one position this part locks a pin provided for such purpose in the backrest structure, fixing its position, while when the backrest is folded the same part, after being released from the aforementioned locking position, again latches onto another pin in the backrest structure to stabilise the new position until the latch part is actuated.

According to the description provided so far, it can be seen that the means that allow transforming a car seat into a bed consist of a minimum number of parts with a simple operation while securing the stable positions that the assembly can assume when the backrest is vertical acting as a seat, or when it is horizontal with the cushion raised, acting as a bed.

It should be remarked that the aforementioned characteristics, as relates to the configuration of the structure of the backrest in relation to the seat cushion, as well as to the arrangement and assembly of the various parts constituting the mechanism as a whole, make it impossible to move the backrest without moving the cushion, as they are permanently connected through the swivelling shaft common to both and about which they can revolve freely, as mentioned before.

DESCRIPTION OF THE DRAWINGS

To complete the description being made and in order to aid a better understanding of the characteristics of the invention, according to an example of a preferred embodiment of it, a set of drawings is accompanied forming an integral part of the description where, for purposes of illustration only and in a non-limiting sense, the following is shown.

PREFERRED EMBODIMENT OF THE INVENTION

Figure 1:
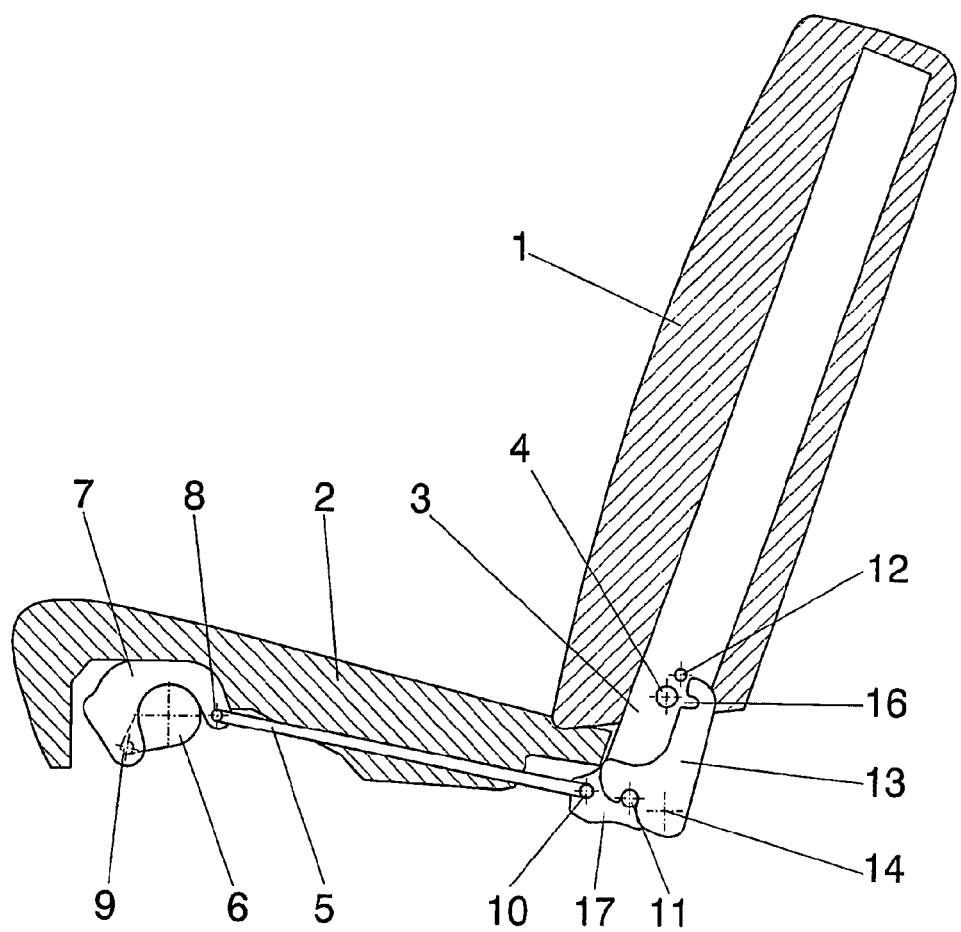
FIG. 1.—Shows a lateral cross section view of the car seat assembly in its resting position.

In view of the aforementioned drawings, it can be seen that the car seat of the invention, transformable into a bed and which conventionally includes a backrest (1) and a seat cushion (2), has the specific characteristic that the structure (3) of the backrest (1) is hinged to the fixed structure of the seat assembly through a swivelling shaft (4). The structure (5) of the cushion (2) is connected to the fixed structure (6) by a connecting rod (7) that is hinged on one end through the swivelling shaft (8) to the structure (5) of the cushion (2). The other end of the connecting rod (7) is hinged by the shaft (9) to the general fixed structure (6) of the seat assembly. The connecting rod (7) is placed near the front part of the cushion (2) and under it, as shown clearly in the figures.

The structure (3) of the backrest (1) and the structure (5) of the cushion (2) are related to each other by a swivelling shaft (10) with respect to which both structures can revolve, this shaft (10) constituting the hinged coupling means between the seat and the cushion.

The structure (3) of the backrest (1), in addition to the swivelling shaft (4) for said backrest and the swivelling or hinge shaft (10) with respect to the cushion, comprises two pins (11) and (12) in which a swivelling part (13) can lock in the form of a latch. The part (13) is hinged to the general structure of the seat through a swivelling shaft (14), so that this part acting as a latch (13) is provided with a pair of notches (15) and (16) that according to the position of the backrest (1) will form positioning means for the pin (11) or the pin (12) respectively, determining the locking and immobilization means for the backrest in either position, that is, the resting position shown in FIG. 1 or its position when transformed into a bed as shown in FIG. 2.

The structure (3) of the backrest (1) extends under and behind the seat cushion (2), determining an end portion (17) in which are precisely provided the pin (11) for locking the backrest (1) in the resting position and the hinging and swivelling shaft (10) between said structure (3) of the backrest (1) and the structure (5) of the cushion (2).

Figure 2:
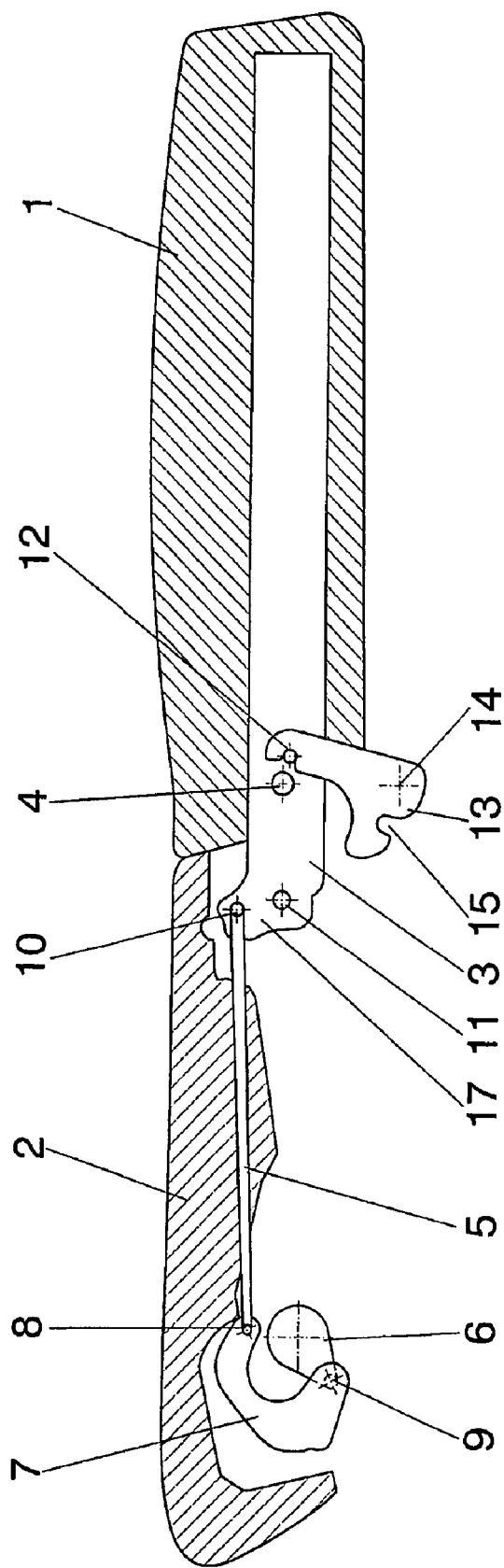
FIG. 2.—Shows another lateral cross section view, in this case of the car seat assembly transformed into a bed by folding back the backrest and slightly raising the seat cushion.

According to these characteristics, in the resting position shown in FIG. 1 the seat acts as such, the backrest (1) maintained stable and locked in this position by the latch part (13) that locks in the pin (11) of the structure (3) of the backrest (1), preventing the latter from folding backwards.

However, if the latch (13) is released from the pin (11) the backrest (1), this is its structure (3), can be folded backwards. This action makes the backrest push on the structure (5) of the cushion (2), moving the latter and slightly raising its rear part, while the connecting rod (7) coupled to the structure (5) of the cushion (2) and to the fixed structure (6) of the seat will swivel to lift the front part of the cushion (2), providing a continuous surface between the cushion (2) and the backrest (1) as shown in FIG. 2. In this position the pin (12) of the structure (3) of the backrest (1) is locked in the notch (16) of the latch (13), remaining stable in his position until the latch (13) is intentionally released from the pin (12).

As may be seen, the transformation of the car seat into a bed in order to lie on it is achieved in a simple manner, with a minimal number of parts and with full efficiency both functionally and safely between the final positions as a seat and as a bed.

What is claimed is:

1. A car seat transformable into a bed, comprising:

a backrest with a backrest structure; and a cushion with a cushion structure, the backrest structure being capable of folding backwards to a horizontal position superficially aligned with the cushion by a slight lifting of the cushion when the backrest is folded, the backrest structure (3) is connected to the cushion structure (5) by a first swivelling shaft (10), about which both structures can revolve freely, the backrest structure (3) is connected to a fixed structure of the seat by a second swivelling shaft (4), and the cushion structure (5) is connected to the fixed structure of the seat (6) by a connecting rod (7) placed near a front part of said cushion, the connecting rod being hinged by a shaft (8) to the cushion structure (5) and by a shaft (9) to the fixed structure (6) of the seat, so that backwards folding of the backrest causes a pushing and lifting of the cushion (2) to define a surface continuity between the cushion and backrest;

wherein two pins (11, 12) are provided on the backrest structure (3) with a swivelling part (13) arranged so as to cooperate with the pins to form a latch, the swivelling part being rotatably mounted on a shaft (14) so that the swivelling part can swivel about the fixed structure of the seat into two latching positions in which a respective one of the pins engages with the swivelling part, one of the latching positions corresponding to a normal-use position of the backrest as a seat, and another of the latching positions corresponding to a folded position of the backrest to form a bed.

* * * * *